United States Patent
Mao et al.

(10) Patent No.: US 12,454,061 B2
(45) Date of Patent: Oct. 28, 2025

(54) SYSTEM AND METHOD FOR OPERATING THE ROBOT, ELECTRONIC DEVICE AND COMPUTER READABLE MEDIUM

(71) Applicant: ABB Schweiz AG, Baden (CH)

(72) Inventors: Yichao Mao, Shanghai (CN); Xinyu Fang, Shanghai (CN)

(73) Assignee: ABB Schweiz AG, Baden (CH)

( * ) Notice: Subject to any disclaimer, the term of this patent is extended or adjusted under 35 U.S.C. 154(b) by 320 days.

(21) Appl. No.: 17/758,869

(22) PCT Filed: Jan. 22, 2020

(86) PCT No.: PCT/CN2020/073906
§ 371 (c)(1),
(2) Date: Jul. 14, 2022

(87) PCT Pub. No.: WO2021/147035
PCT Pub. Date: Jul. 29, 2021

(65) Prior Publication Data
US 2023/0032982 A1 Feb. 2, 2023

(51) Int. Cl.
*B25J 9/16* (2006.01)
*B25J 13/08* (2006.01)
*G05B 19/042* (2006.01)

(52) U.S. Cl.
CPC ............ *B25J 9/1697* (2013.01); *B25J 13/08* (2013.01); *G05B 19/042* (2013.01)

(58) Field of Classification Search
CPC ........ B25J 9/1697; B25J 13/08; B25J 9/1669; B25J 9/00; B25J 9/16; B25J 9/161;
(Continued)

(56) References Cited

U.S. PATENT DOCUMENTS

| 6,104,158 A | 8/2000 | Jacobus et al. | |
|---|---|---|---|
| 2014/0067317 A1* | 3/2014 | Kobayashi | G05D 3/00 702/153 |

(Continued)

FOREIGN PATENT DOCUMENTS

| CN | 103517789 A | 1/2014 |
|---|---|---|
| CN | 103831695 A | 6/2014 |

(Continued)

OTHER PUBLICATIONS

University, Japan, 2008 IEEE/RSJ International Conference on Intelliger Robots and Systems, Acropolis Convention Koichiro Deguchi, et al., "A Goal Oriented Just-In-Time Visual Servoing for Ball Catching Robot Arm", Tohoku. Center, Nice, France, Sep. 22-26, 2008; 6 pages.

(Continued)

*Primary Examiner* — Adam R Mott
*Assistant Examiner* — Byron Xavier Kasper
(74) *Attorney, Agent, or Firm* — GREENBERG TRAURIG, LLP

(57) ABSTRACT

A system and a method for operating a robot. The system includes a first data collector coupled to the robot and configured to determine first position information of the robot based on feedback data received from the robot. The system also includes a second data collector coupled to a sensor and configured to determine second position information of an object to be operated by the robot based on sensing data received from the sensor. The system further comprises a first estimator coupled to the first data collector and the second data collector, and configured to generate a first prediction of a target position at which the object is operated by the robot and a command generator configured to generate a command for operating the robot at least partially based on the first prediction.

18 Claims, 7 Drawing Sheets

(58) Field of Classification Search
CPC ...... B25J 9/1633; B25J 9/1653; B25J 13/081; B25J 13/085; G05B 19/042; G05B 2219/37512; G05B 2219/40024; G05B 19/02

See application file for complete search history.

(56) References Cited

U.S. PATENT DOCUMENTS

| | | |
|---|---|---|
| 2014/0074291 A1 | 3/2014 | Emoto |
| 2015/0158176 A1 | 6/2015 | Fujita et al. |
| 2016/0001445 A1* | 1/2016 | Setsuda ............... G05B 19/425 700/260 |
| 2017/0165832 A1 | 6/2017 | Wettels |
| 2018/0126553 A1* | 5/2018 | Corkum ................. B25J 9/1697 |
| 2018/0262656 A1* | 9/2018 | Uchida .................... H04N 5/04 |
| 2018/0354130 A1 | 12/2018 | Preisinger et al. |
| 2019/0112134 A1* | 4/2019 | Ooba ..................... B65G 43/08 |
| 2019/0160682 A1* | 5/2019 | Sato ........................ B25J 9/162 |
| 2019/0299405 A1 | 10/2019 | Warashina et al. |
| 2020/0023521 A1* | 1/2020 | Dan ....................... B25J 9/1692 |
| 2022/0168896 A1* | 6/2022 | Liang .................... B25J 9/1692 |

FOREIGN PATENT DOCUMENTS

| | | |
|---|---|---|
| CN | 103862340 A | 6/2014 |
| CN | 104540648 A | 4/2015 |
| CN | 106141645 A | 11/2016 |
| CN | 106272427 A | 1/2017 |
| CN | 106671104 A | 5/2017 |
| CN | 206170098 U | 5/2017 |
| CN | 106927079 A | 7/2017 |
| CN | 107650149 A | 2/2018 |
| CN | 107962589 A | 4/2018 |
| CN | 108161991 A | 6/2018 |
| CN | 108326393 A | 7/2018 |
| CN | 108369406 A | 8/2018 |
| CN | 110315505 A | 10/2019 |
| JP | 2003211381 A | 7/2003 |
| JP | 2012245568 A | 12/2012 |
| KR | 1697698 B1 | 1/2017 |

OTHER PUBLICATIONS

International Search Report and Written Opinion, issued by the ISA/CN National Intellectual Property Administration; regarding corresponding patent application Serial No. PCT/CN2020/073906; dated Oct. 28, 2020; 9 pages.

* cited by examiner

SYSTEM AND METHOD FOR OPERATING THE ROBOT, ELECTRONIC DEVICE AND COMPUTER READABLE MEDIUM

CROSS-REFERENCE TO RELATED APPLICATIONS

This is a national stage application which claims priority to International patent application Serial No.: PCT/CN2020/073906, filed on Jan. 22, 2020; and which is herein incorporated by reference in its entirety.

FIELD

Embodiments of the present disclosure generally relate to a system and a method for operating the robot, an electronic device and computer readable medium.

BACKGROUND

A sensor-based robot application plays an important role in in agile and flexible automation. A plurality of sensors may be disposed for monitoring the gesture of the robot and detect data associated with the position of the robot or the movement of the robot. By using the sensor-based robot application, the commission time could be reduced and the production efficiency could be improved. Meanwhile, the robot skills and the product varieties could be deeply extended.

Generally, in a conditional use scenario of the sensor-based robot application, a task for the operation of the robot may be divided into several procedures and each procedure uses only one sensor to adjust the operation of the robot. For example, the robot could be guided to a position at first by using the vision and then applied a force control to assemble the part.

In a further conditional use scenario, the plurality of sensors could be used simultaneously, which may require combining the output of different individual sensors. For example, the control signal is determined based on a weighted summation of the outputs of a force sensor and a vision sensor.

The above-mentioned use scenarios have problems of asynchronous sensor signals and the time delay of the sensor signals, which may impair the stability and limit the performance of a servo task.

SUMMARY

Embodiments of the present disclosure provide a system and a method for operating the robot and computer readable medium.

In a first aspect, a system for operating the robot is provided. The system comprises a first data collector coupled to the robot and configured to determine first position information of the robot based on feedback data received from the robot and a second data collector coupled to a sensor and configured to determine second position information of an object to be operated by the robot based on sensing data received from the sensor. The system further comprises a first estimator coupled to the first data collector and the second data collector, and configured to generate, based on the first and the second position information, a first prediction of a target position at which the object is operated by the robot and a command generator coupled to the estimator and configured to generate a command for operating the robot at least partially based on the first prediction.

Through the system proposed in the first aspect, the robot operation can be performed more accurately and efficiently. For the user-side operators, a sensor-based servo can provide a more flexible solution. The system proposed in the first aspect can be used with any traditional robots, which the user has been deployed. Thus, the users do not have to bear the cost caused by the modification of a large number of components. For the producers, the system may simplify the process for implementing multi-sensor-based solutions and reduce the time of developing. Meanwhile, the ability in automation area can be extended and the performance of the sensor-based application could be improved.

In some embodiments, the first data collector is further configured to receive the feedback data of the robot in a first time period; obtain, from the feedback data of the robot, a set of coordinate parameters of a joint end of the robot in a coordinate system of the robot; and determine the first position information based on the set of coordinate parameters.

In some embodiments, the second data collector is further configured to receive the sensing data of the sensor in a second time period, the second time period overlapping with a first time period for receiving the feedback data of the robot; obtain, from the sensing data of the sensor, a set of position relationships between the robot and the object in a further coordinate system of the sensor; and determine the second position information based on the set of position relationships.

In this system of the first aspect, both the data from the robot-side and the sensor-side will be collected by the first stage of the system and transformed to the respective position information, which are necessary for a subsequence estimation of the target position of the robot. In particular, instead of transmitting only the sensing data related to a single operation of the robot, a set of the feedback/sensing data captured in a certain time period may be transmitted to the data collector, which is advantageous for prediction of the target position, because the result of the prediction will be more accurate and the prediction process will be accelerated at the same time.

In some embodiments, the first estimator is further configured to calibrate a first set of time stamps of the first position information and a second set of time stamps of the second information based on a predetermined time delay.

In general, there is a time delay between the time point at which the data collector receives the data and the sampled time point of the feedback data of the robot or the sensed time point of the sense data of the sensor, thus a time stamp calibration is necessary before the prediction procedure. In this way, the accuracy of predictions will be significantly improved.

In some embodiments, the first estimator is further configured to obtain, from the first position information, a first set of sampled parameters characterizing a reference position of the robot at a predetermined time point; obtain, from the second position information, a second set of sampled parameters characterizing a reference position relationship between the robot and the object at the predetermined time point; and generate the first prediction of the target position by fusing the first set of sampled parameters and the second set of sampled parameters based on a fusion mode associated with an expected operation to be performed by the robot.

In some embodiments, the fusion mode comprises at least one of a predictor mode, a filter mode, a sum mode and a subtraction mode.

In the process of data fusion, the position information of the robot and the position information of the object at the same acquisition time point can be considered as data for predicting the target position. By predicting the target position based on data from different data sources, high-quality prediction results may be obtained more efficiently. Meanwhile, a plurality of fusion mode corresponding to the certain operator may be predetermined based on the desired operation process of the robot. In this way, any excepted robot operation procedure may be more easily implemented and developed.

In some embodiments, the second data collector is further coupled to a further sensor and configured to determine third position information of the object based on further sensing data received from the further sensor and the first estimator is further configured to generate a second prediction of the target position based on the first position information and the third position information.

In some embodiments, the system further comprises a second estimator coupled to the first estimator and configured to generate a third prediction of the target position by fusing the first prediction of the target position and the second prediction of the target position.

The position information of object, determined based on date received from more than one sensor may be fused with the position information of the robot, respectively and a set of preliminary predictions of the target position may be obtained. Subsequently, a final prediction of the target position may be generated by fusing the set of preliminary predictions. In this way, the robot can be operated more precisely based on the two-stages prediction.

In some embodiments, the command generator is further configured to generate the command for operating the robot based on the third prediction.

In a second aspect, a method for operating the robot is provided. The method comprises determining first position information of the robot based on feedback data received from the robot; determining second position information of an object to be operated by the robot based on sensing data received from the sensor; generating, based on the first and the second position information, a first prediction of a target position at which the object is operated by the robot; and generating a command for operating the robot at least partially based on the first prediction.

In some embodiments, determining the first position information comprises receiving the feedback data of the robot in a first time period; obtaining, from the feedback data of the robot, a set of coordinate parameters of a joint end of the robot in a coordinate system of the robot and determining the first position information based on the set of coordinate parameters.

In some embodiments, determining the second position information comprises receiving the sensing data of the sensor in a second time period, the second time period overlapping with a first time period for receiving the feedback data of the robot; obtaining, from the sensing data of the sensor, a set of position relationships between the robot and the object in a further coordinate system of the sensor; and determining the second position information based on the set of position relationships.

In some embodiments, the method further comprises calibrating a first set of time stamps of the first position information and a second set of time stamps of the second information based on a predetermined time delay.

In some embodiments, generating the first prediction comprises obtaining, from the first position information, a first set of sampled parameters characterizing a reference position of the robot at a predetermined time point; obtaining, from the second position information, a second set of sampled parameters characterizing a reference position relationship between the robot and the object at the predetermined time point; and generating the first prediction of the target position by fusing the first set of sampled parameters and the second set of sampled parameters based on a predetermined fusion mode associated with an expected operation to be performed by the robot.

In some embodiments, the fusion mode comprises at least one of a predictor mode, a filter mode, a sum mode and a subtraction mode.

In some embodiments, the method further comprises determining third position information of the object based on further sensing data received from the further sensor and generating a second prediction of the target position based on the first position information and the third position information.

In some embodiments, the method further comprises generating a third prediction of the target position by fusing the first prediction of the target position and the second prediction of the target position.

In some embodiments, the method further comprises generating the command for operating the robot based on the third prediction.

In a third aspect, an electronic device is provided. The electronic device comprises a processor; and a memory coupled to the processor and storing instructions for execution, the instructions, when executed by the processor, causing the device to perform the method of the second aspect.

In a fourth aspect, a computer readable medium is provided. The computer readable medium comprises program instructions for causing an electronic device to perform at least the method of the second aspect.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

Figure 1:
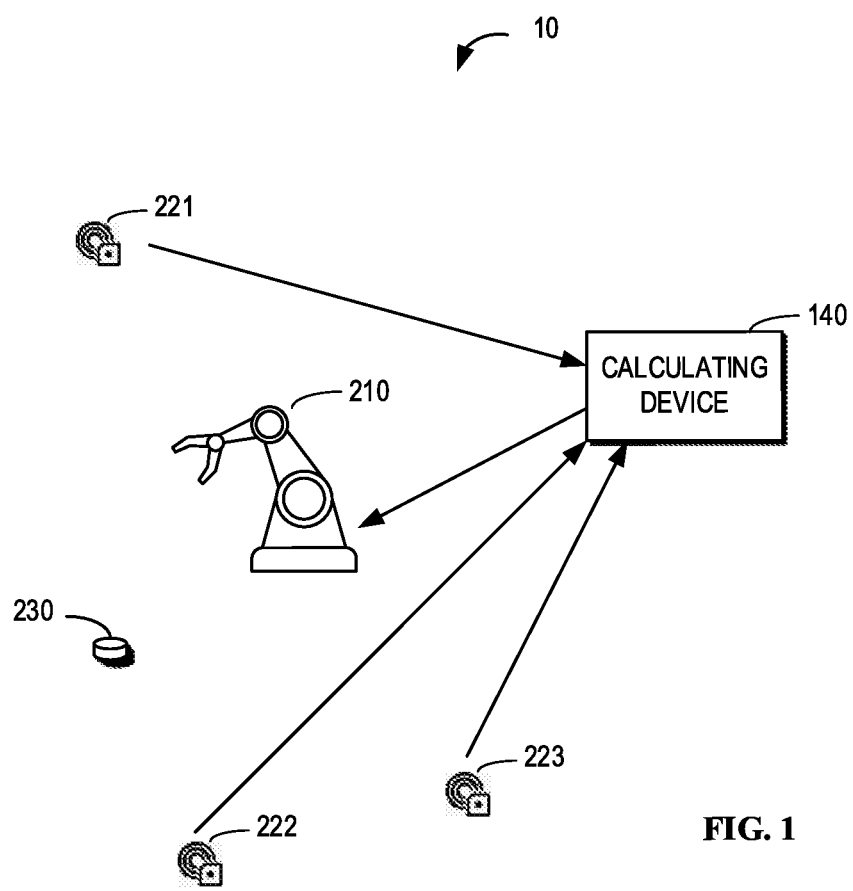
FIG. 1 shows an example operating environment in which embodiments of the present disclosure may be implemented.

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

As described above, a sensor-based robot application plays an important role in in agile and flexible automation. A plurality of sensors may be disposed for monitoring the gesture of the robot and detect data associated with the position of the robot or the movement of the robot. By using the sensor-based robot application, the commission time could be reduced and the production efficiency could be improved. Meanwhile, the robot skills and the product varieties could be deeply extended.

FIG. 1 shows an example operating environment in which embodiments of the present disclosure may be implemented. As shown in FIG. 1, the operating environment 10 may comprise a robot 210 and an object 230. In some embodiments, the object 230 may be considered as a stationary object. In some other embodiments, the object 230 may be movable with respect to the robot 210. The robot 210 may be operated to capture the object or perform a specific action for the object.

The operating environment 10 as shown in FIG. 1 may also comprise sensors 221, 222 and 223 and a calculating device 140. The sensors 221, 222 and 223 may monitor the gesture or the position of the robot and the object and/or a position relationship between the robot and the object and transmit the sensing data to the calculating device 140. The robot 210 may also transmit its own feedback data to the calculating device 140. It is to be understood that the number of sensors shown in FIG. 1 is given for the purpose of illustration without suggesting any limitations. The operating environment 10 may include any suitable number of sensors.

In some embodiments, at least one sensor from the sensors 221, 222 and 223 can be a camera. Based on the data provided by the camera, the calculating device 140 may determine the position of the robot and the object and estimate a position which the robot should be reached in a subsequence action.

Generally, in a conditional use scenario of the sensor-based robot application, a task for the operation of the robot may be divided into several procedures and each procedure uses only one sensor (for example, sensor 221) to adjust the operation of the robot. For example, the robot could be guided the robot to a position at first by using the vision and then applied a force control to assemble the part.

In a further conditional use scenario, the sensors 221, 222 and 223 could be used simultaneously, which may require combining the output of different individual sensors 221, 222 and 223. For example, the control signal is determined based on a weighted summation of the outputs of a force sensor and a vision sensor.

Although multiple sensors-based servo system is a future technology in robot application which improves the intelligence and the adaptability in a dynamic environment, in either scenario, some problems are remained. For example, sensors are not synchronized. Due to the difference in sample rate, the data from different sensors are very likely collected at the different time instance. Even in the "one sensor at a time" scenario, the sensor is not synchronized with robot controller. Furthermore, all sensors have time delays. In some extreme case, the data may be lost during communication. This makes the above unsynchronized issue even worse. Moreover, each sensor can only estimate a part of the states of the target object, which may be overlapped or separate. The conventional solution, which generates a command for the robot only by adding the output of each controller, may not be satisfied in this situation.

Therefore, embodiments of the present disclosure proposed a solution for operating the robot. A general framework suitable for operating the traditional robot can be provided, which may receive data from both robot and sensor side and predict a target position of the robot by fusing the data from different data source.

Figure 2:
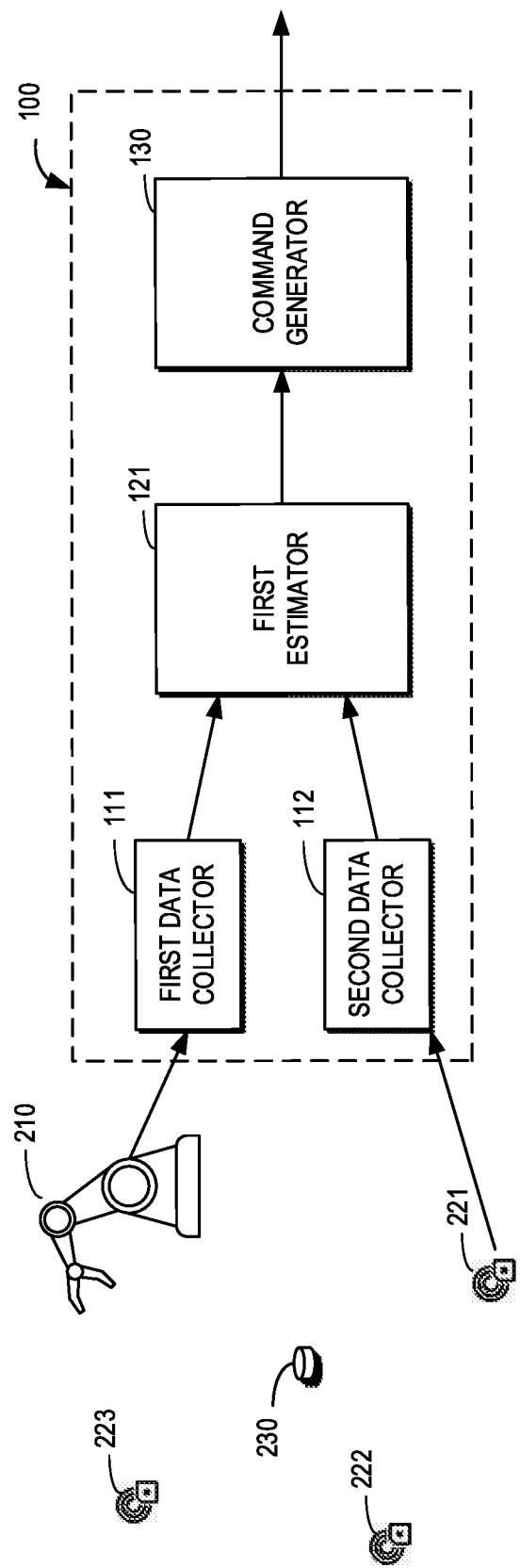
FIG. 2 shows a schematic diagram of a system for operating the robot according to embodiments of the present disclosure.

Principle and implementations of the present disclosure will be described in detail below with reference to FIGS. 2 to 6. FIG. 2 shows a schematic diagram of a system for operating the robot according to embodiments of the present disclosure. For the purpose of discussion, the system 100 will be described with reference to FIG. 1. It would be appreciated that although the system 100 has been described in the operating environment 10 of FIG. 1, this system 100 may be likewise applied to other operating environments.

As shown in FIG. 2, the system 100 may comprise a first data collector 111 and a second data collector 112. The first data collector 111 may be coupled to the robot 210 and the second data collector 112 may be coupled to a set of sensors (sensors 221-223).

The robot 210 may transmit its own feedback data to the first data collector 111 and the first data collector 111 may determine first position information of the robot based on the received feedback data. In some embodiments, the feedback data may be referred to a set of coordinate parameters of a joint end of the robot in a coordinate system of the robot recorded by the robot controller in a first time period in a process of the robot movement. For example, parameters of the robot Tool Center Point (TCP) may be considered as the feedback data.

For an industrial robot, one or more tools may be installed on the robot to operate the object. To describe the tool in a space, a coordinate system on the tool, namely the tool coordinate system (TCS) may be defined and the origin of the tool coordinate system may be considered as a TCP. In the TCS, six degrees of freedom or six pieces of information are typically required to completely define the pose of the end joint of the robot, because it can move along three directions in a space and also rotate around the three directions. In some embodiments, the first data collector 111 then may determine first position information of the robot based on the set of coordinate parameters.

Furthermore, the first data collector 111 may also comprise a robot model, which may record the position of robot TCP and label the data with a time stamp. This time stamp may be the original time stamp subtracts a time delay of robot execution.

Referring back to FIG. 2, the sensor 221 may transmit the sensing data to the second data collector 112 and the second data collector 112 may determine second position information of the object 230 to be operated by the robot 210 based on sensing data received from the sensor 221.

For example, the sensing data may be referred to as a set of images captured by the sensor in a second time period. The set of images may reflect a set of position relationships between the robot 210 and the object 230 in coordinate system of the sensor 211. The second time period may be overlapped with the first time period, during which the feedback data is recorded by the robot controller.

The second data collector 112 may determine the second position information based on the set of position relationships. In some embodiments, the second position information may be referred to position information of the object 230 with respect to the robot 210. The second position information may also include the position information of the object 230 and the position information of the robot 210.

Furthermore, the second data collector 112 may also comprise a sensor model. The sensor model is the relationship between the sensing data and the motion of the robot. This module may transform the sensing data into position estimation and label the data with a time stamp. This time stamp may also be the original time stamp subtracts the time delay.

As mentioned above, the first and the second data collector may receive data from its individual data source. The first and the second data collector can be considered as an interface layer of the system 100. In general, the interface layer is responsible to receive and translate external information. The users can configure the interface type and related parameters. Further, the interface layer may include a command interface, which may be used to receive external command and inform the downstream processing layer an application to be performed. The sensor pool of the interface layer may be a group of user defined sensor models. Each sensor model has a communication interface to receive data, a model to transform sensing data to position information and a data buffer to record stamped sensing data. The time stamp is labeled with a time delay for delay compensation in the downstream processing layer.

As described above, both the data from the robot-side and the sensor-side will be collected by the first layer of the system and transformed to the respective position information, which are necessary for a subsequence estimation of the target position of the robot. In particular, instead of transmitting only the sensing data related to a single operation of the robot, a set of the feedback/sensing data captured in a certain time period may be transmitted to the data collector, which is advantageous for prediction of the target position, because the result of the prediction will be more accurate and the prediction process will be accelerated at the same time.

As shown in the FIG. 2, the system 100 may further comprise a first estimator 121. The first estimator may be coupled to the first and the second data collectors and configured to generate a first prediction of a target position based on the first and the second position information. The object 230 may be operated by the robot 230 at the target position.

In some embodiments, the first position information and the second position information could be fused in the first estimator 121. For example, the first estimator 121 may obtain a first set of sampled parameters from the first position information and obtain a second set of sampled parameters from the second position information. The first set of sampled parameters may characterize a reference position of the robot 210 at a predetermined time point and the second set of sampled parameters may characterize a reference position relationship between the robot 210 and the object 230 at the same time point.

The first estimator 121 may further generate the first prediction of the target position by fusing the first set of sampled parameters and the second set of sampled parameters based on a fusion mode, which may be associated with an expected operation to be performed by the robot.

In general, there is a time delay between the time point at which the data collector receives the data and the sampled time point of the feedback data of the robot or the sensed time point of the sense data of the sensor, thus a time stamp calibration is necessary before the prediction procedure. Compare with the sensing data of the sensor 221, the feedback data of the robot 210 usually has a higher feedback frequency. Thus, there is a buffer in the first estimator 121.

In some embodiments, the buffer may record the data of the sensors, the feedback data of the robot 210. After the user configures the time delay T_delay of each sensor, each sensor data may be added a time stamp when it is recorded. For example, if the timestamp T_record represents the time when the system 100 receives the data, the sampled time point T_record of the data, at which the data is exactly sampled, may represent as T_receive subtracts the time delay T_delay of the sensor. Therefore, before the data fusion, the first estimator 121 may calibrate a first set of time stamps of the first position information and a second set of time stamps of the second information based on a predetermined time delay. In this way, the accuracy of predictions will be significantly improved.

Figure 4A:
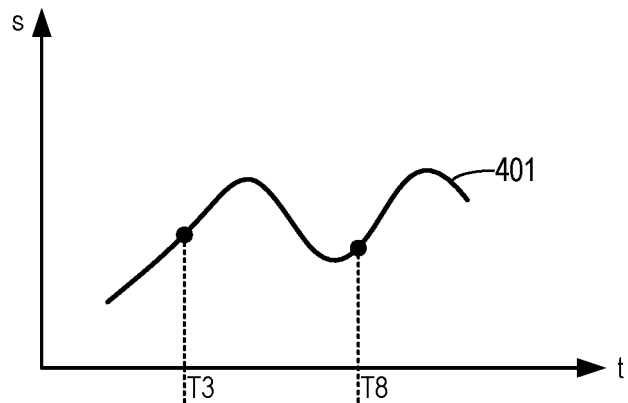
FIGS. 4A-4C show example processes of data fusion according to embodiments of the present disclosure.
Figure 4B:
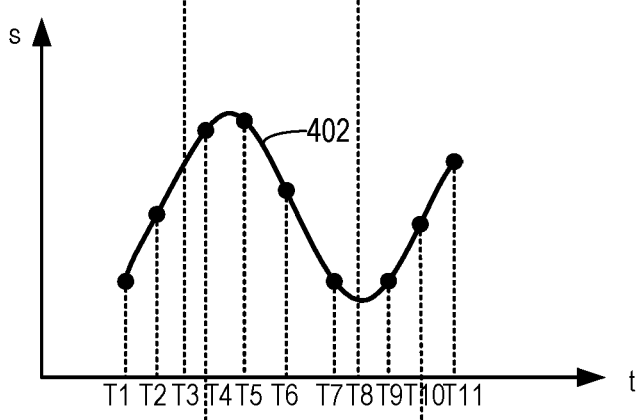

With reference to FIGS. 4A and 4B, the data fusion of the first set of sampled parameters from the first position information and the second set of sampled parameters from the second position information may be further described in detail.

FIG. 4A shows an example of a curve 401 of a sampled signal associated with the second position information and FIG. 4B shows an example of a curve 402 of a sampled signal associated with the first position information. As shown in FIG. 4A, the second set of sampled parameters may refer to parameters at time points T3 and T8. That is, a set of parameters sampled at time point T3 of the curve 401 may reflect the position relationship between the robot 210 and the object 230 at the time point T3 captured by the sensor 221, for example. To fuse the first and the second sets of parameters, parameters sampled at T3 of curve 402 may be required. However, the parameters sampled at T3 of the curve 402 may not be read from the curve 402 directly. That is, the first set of sampled parameters may not be direct obtained from the first position information. Instead, the sampled parameters at time point T3 of the curve 402 may be calculated based on the parameters sampled at other sampled time points, for example, based on parameters sampled at T2 and T4 of the curve 402. The sampled parameters at time point T3 of the curve 402 may reflect the position of the robot at the time point T3. Then, the sampled parameters at time point T3 of the curve 401 may be fused with sampled parameters at time point T3 of the curve 402, to generate a prediction of the target position of the robot. For the data fusion of the parameters sampled at time point T8 of both curve 401 and 402, an analogous procedure may be performed.

In some embodiments, the first estimator 121 also include an operator pool to provide the operators corresponding to the fusion mode, such as a Kalman mode, a Predictor mode, a Filter mode, an Observer mode, a Sum mode or a Subtraction mode. These fusion modes may be preconfigured for the specific task assigned by the sensor model.

As mentioned above, the data fusion performed in the first estimator 121 may be referred to as a first fusion process. The first fusion process is used to fuse one sensor data with robot motion feedback. In most sensor in hand applications, the sensor data is influenced by the deviation between the position/orientation of robot effector and the position/orientation of a target. Hence, the sensor module can first provide an estimation of position/orientation error between robot effector and target. If this sensor has a time delay, the buffer module can provide an estimation of robot effector position/orientation at the time the sensor samples the data by regressing the robot motion feedback. By adding these sampled data, the system 100 can provide an estimation of target position/orientation at the time the sensor samples the data.

Referring back to FIG. 2, the system 100 may also comprises a command generator 130 coupled to the first estimator 121. The command generator 130 may be configured to generate a command for operating the robot 210 at least partially based on the first prediction of the target position.

In the process of data fusion, the position information of the robot and the position information of the object at the same acquisition time point can be considered as data for predicting the target position. By predicting the target position based on data from different data sources, high-quality prediction results may be obtained more efficiently. Meanwhile, a plurality of fusion mode corresponding to the certain operator may be predetermined based on the desired operation process of the robot. In this way, any excepted robot operation procedure may be more easily implemented and developed.

In some embodiments, more than one sensors may transmit the sensing data to the second data collector 112 and therefore a plurality of the first predictions of the target position may be generated at the first estimator 121. In this case, the plurality of the first predictions may be considered as preliminary predictions and may be further fused to generate a final prediction.

Figure 3:
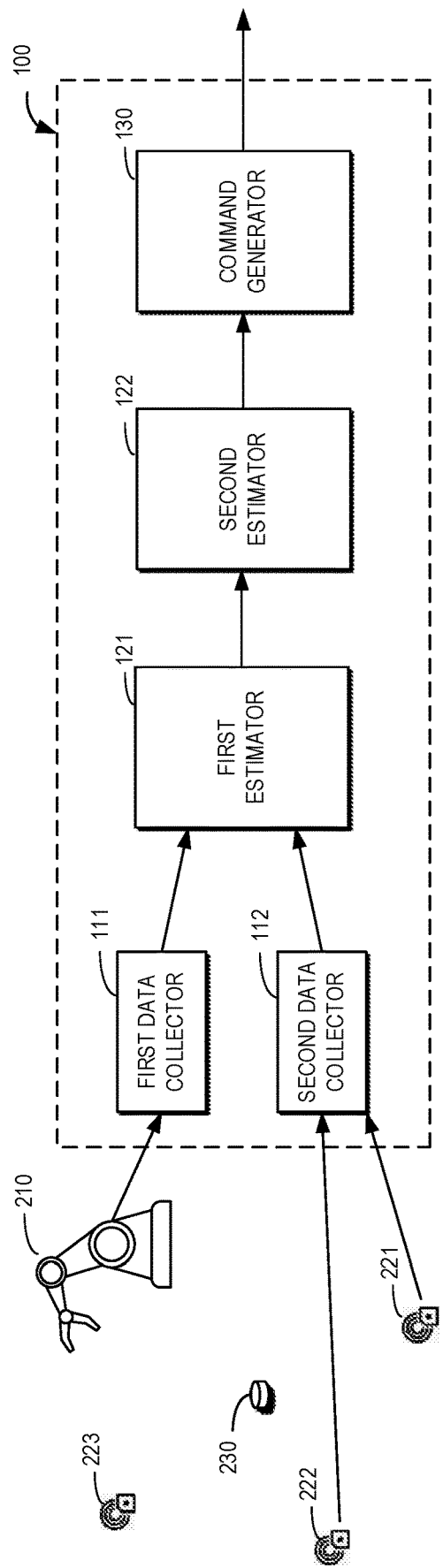
FIG. 3 shows a schematic diagram of a system for operating the robot according to embodiments of the present disclosure.

FIG. 3 shows a schematic diagram of a system for operating the robot according to embodiments of the present disclosure. Comparing with FIG. 2, a second estimator 122 is added. Other components may be same or similar with the corresponding components as shown in FIG. 2.

As shown in FIG. 3, the sensor 222 may transmit the sensing data to the second data collector 112. The second data collector 112 may determine third position information of the object 230 based on the sensing date from the sensor 222.

As described above, the first position information obtained from the first data collector 111 and the second position information obtained from the second data collector 112 may be fused to generate a prediction of the target position of the robot 210. Similarly, the first estimator 121 may further generate a second prediction of the target position based on the first position information and the third position information, for example by fusing the first position information and the third position information.

Figure 4C:
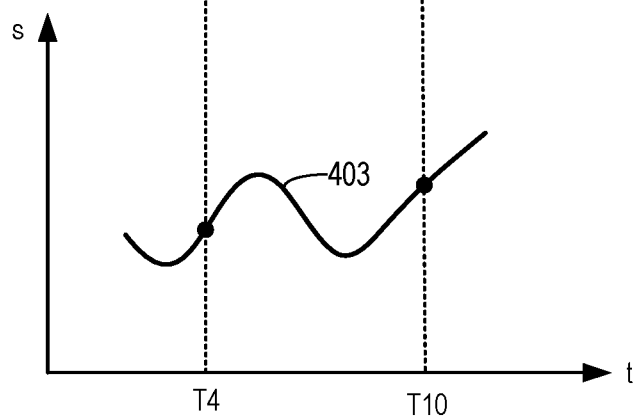

Further referring to FIGS. 4B and 4C, the procedure of the data fusion of the first position information and the third position information may be similar with that of the first position information and the second position information.

FIG. 4C shows an example of a curve 403 of a sampled signal associated with the third position information and FIG. 4B shows an example of a curve 402 of a sampled signal associated with the first position information. As shown in FIG. 4C, the third set of sampled parameters may refer to parameters at time points T4 and T10. That is, a set of parameters sampled at time point T4 of the curve 403 may reflect the position relationship between the robot 210 and the object 230 captured by the sensor 222 at the time point T4, for example. To fuse the first and the third sets of parameters, parameters sampled at T4 of curve 402 may be required. However, the parameters sampled at T4 of the curve 402 may not be read from the curve 402 directly. That is, the first set of sampled parameters may not be direct obtained from the first position information. Instead, the sampled parameters at time point T4 of the curve 402 may be calculated based on the parameters sampled at other sampled time points, for example, based on parameters sampled at T2 and T5 of the curve 402. The sampled parameters at time point T4 of the curve 402 may reflect the position of the robot at the time point T4. Then, the sampled parameters at time point T4 of the curve 403 may be fused with sampled parameters at time point 4 of the curve 402, to generate a further prediction of the target position of the robot 210. For the data fusion of the parameters sampled at time point T10 of both curve 403 and 402, an analogous procedure may be performed.

Figure 5A:
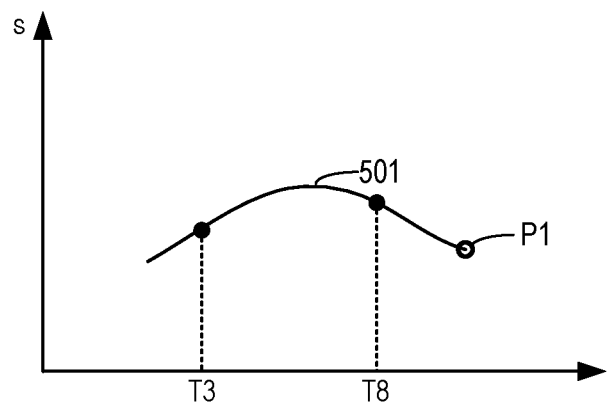
FIGS. 5A-5B show example results of data fusion shown in FIGS. 4A-4C according to embodiments of the present disclosure.
Figure 5B:
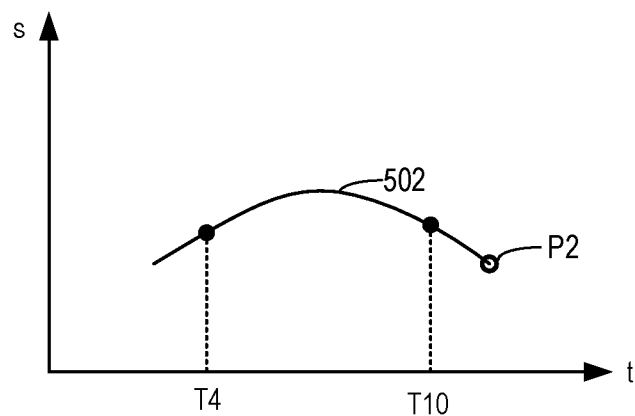

FIGS. 5A-5B show example results of data fusion shown in FIGS. 4A-4C according to embodiments of the present disclosure. FIG. 5A shows a result of data fusion of the first and the second position information and the FIG. 5B shows a result of data fusion of the first and the third position information. For example, the value of the curve 501 shown in FIG. 5A represent a result of data fusion of the parameters of the first position information and the second position information at the time point T3. Based on the curve 501 obtained by fusing the first and the second position information and the curve 502 obtained by fusing the first and the third position information, two preliminary prediction of the target position may be generated, namely the value of P1 in curve 501 and the value P2 of the curve 502.

Referring back to FIG. 3, the system 100 may also comprise a second estimator 122. The second estimator 122 may be coupled to the first estimator 121 and generate a third prediction of the target position by fusing the first prediction of the target position and the second prediction of the target position. For example, as shown in FIGS. 5A and 5B, the preliminary prediction of the target position P1 and the preliminary prediction of the target position P2 may be fused, the fused value may be considered as a final prediction of the target position. In this case, the command generator 130 may generate the command for operating the robot 210 based on this final prediction of the target position.

The data fusion for generating the final prediction may be considered as a second fusion procedure. The preliminary predictions of target position/orientation may be sent to the buffer with a timestamp in the second fusion module in the second estimator. In most applications, the object moves at a relatively lower speed compared to the motion of the robot. Hence, the regression of target position and orientation may provide a more reliable prediction than the regression of sensor data.

In general, the estimator 121 and 122 may be considered as an estimation layer of the system. The estimation layer estimates target posture of the robot and velocity based on different sensor data and the feedback data of the robot. The estimation operation is specific in different tasks, which are stored in a task pool of this layer.

The command generator 130 may be considered as a servo layer of the system. The posture prediction of the target and the robot effector are sent into an online planner. The speed, accelerations and accuracies of the planner may be configured by the users, and then the planner will compute a motion command according to the configuration and send it to the robot. The cycle time of planner is independent with the feedback rate of sensors, which improves servo performance with low speed sensors.

It is to be understood that the system 100 as shown in FIGS. 2 and 3 may be implemented with any hardware and software. For example, the system 100 may be implemented as the calculating device 140 as shown in FIG. 1. The system 100 may also be implemented as an integrate chip. The components of the system 100 may be considered as entities capable of performing certain functions, such as data collectors, estimators, instruction generators, and the like. The components in the system 100 may also be considered as virtual modules capable of implementing certain functions.

In view of above, in the system 100 shown in FIGS. 2 and 3, both the data from the robot-side and the sensor-side will be collected by the first stage of the system and transformed to the respective position information, which are necessary for a subsequence estimation of the target position of the robot. In particular, instead of transmitting only the sensing data related to a single operation of the robot, a set of the feedback/sensing data captured in a certain time period may be transmitted to the data collector, which is advantageous for prediction of the target position, because the result of the prediction will be more accurate and the prediction process will be accelerated at the same time.

Through the system proposed in the present disclosure, the robot operation can be performed more accurately and efficiently. For the user-side operators, a sensor-based servo can provide a more flexible solution. The system proposed in the first aspect can be used with any traditional robots, which the user has been deployed. Thus, the users do not have to bear the cost caused by the modification of a large number of components. For the producers, the system may simplify the process for implementing multi-sensor-based solutions and reduce the time of developing. Meanwhile, the ability in automation area can be extended and the performance of the sensor-based application could be improved.

Figure 6:
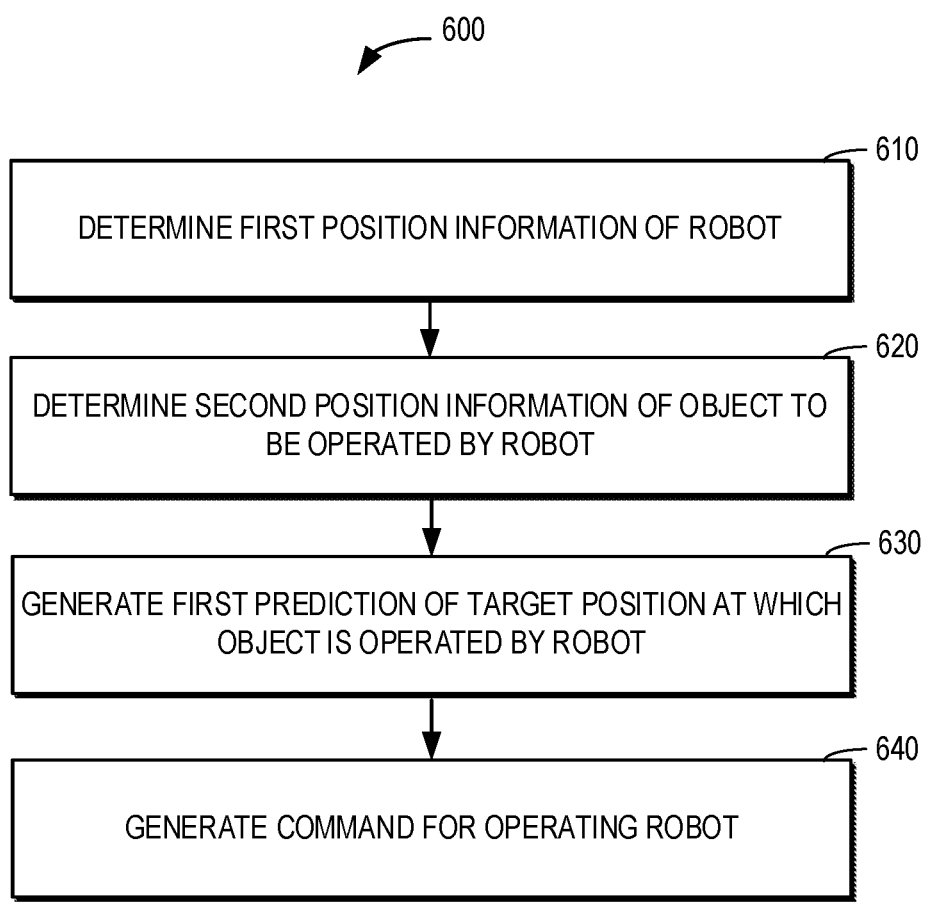
FIG. 6 shows a flowchart illustrating a method for operating the robot according to embodiments of the present disclosure.

FIG. 6 shows a flowchart illustrating a method for operating the robot according to embodiments of the present disclosure. For the purpose of discussion, the method 600 will be described from the perspective of the system 100 with reference to FIGS. 2-3.

At 610, the system 100 determines first position information of the robot based on feedback data received from the robot. At 620, the system 100 determines second position information of an object to be operated by the robot based on sensing data received from the sensor; generating, based on the first and the second position information.

In some embodiments, determining the first position information comprises receiving the feedback data of the robot in a first time period; obtaining, from the feedback data of the robot, a set of coordinate parameters of a joint end of the robot in a coordinate system of the robot and determining the first position information based on the set of coordinate parameters.

In some embodiments, determining the second position information comprises receiving the sensing data of the sensor in a second time period, the second time period overlapping with a first time period for receiving the feedback data of the robot; obtaining, from the sensing data of the sensor, a set of position relationships between the robot and the object in a further coordinate system of the sensor; and determining the second position information based on the set of position relationships.

At 630, the system 100 generates, based on the first and the second position information, a first prediction of a target position at which the object is operated by the robot.

In some embodiments, the system 100 may further calibrate a first set of time stamps of the first position information and a second set of time stamps of the second information based on a predetermined time delay.

In some embodiments, generating the first prediction comprises obtaining, from the first position information, a first set of sampled parameters characterizing a reference position of the robot at a predetermined time point; obtaining, from the second position information, a second set of sampled parameters characterizing a reference position relationship between the robot and the object at the predetermined time point; and generating the first prediction of the target position by fusing the first set of sampled parameters and the second set of sampled parameters based on a predetermined fusion mode associated with an expected operation to be performed by the robot.

In some embodiments, the fusion mode comprises at least one of a predictor mode, a filter mode, a sum mode and a subtraction mode.

At 640, the system 100 generates a command for operating the robot at least partially based on the first prediction.

In some embodiments, the system 100 may further determine third position information of the object based on further sensing data received from the further sensor and generating a second prediction of the target position based on the first position information and the third position information.

In some embodiments, the system 100 may further generate a third prediction of the target position by fusing the first prediction of the target position and the second prediction of the target position.

In some embodiments, the system 100 may further generate the command for operating the robot based on the third prediction.

Figure 7:
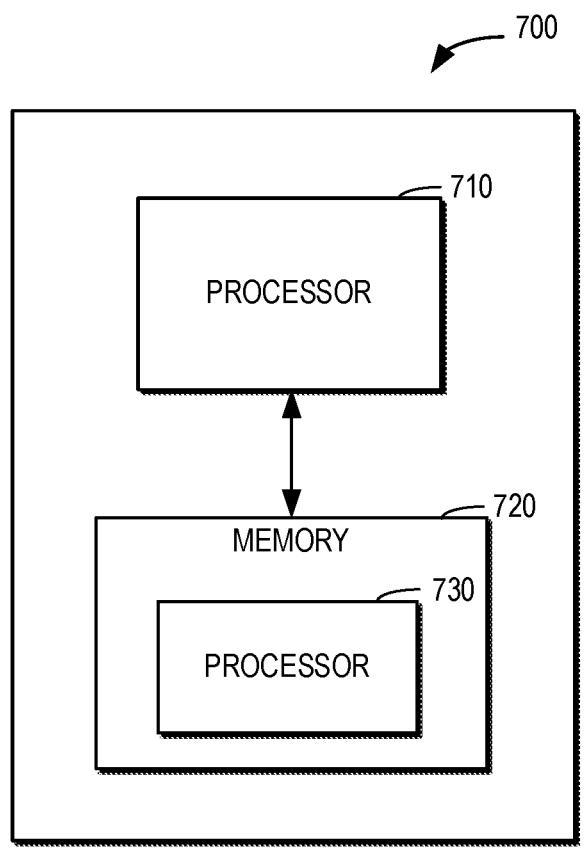
FIG. 7 shows a block diagram of an example computer readable medium in accordance with some example embodiments of the present disclosure.

FIG. 7 is a simplified block diagram of a device 700 that is suitable for implementing embodiments of the present disclosure. The device 700 may be provided to implement the system 100 as shown in FIGS. 2 and 3. As illustrated in FIG. 7, the device 700 may comprise a computer processor 710 coupled to a computer-readable memory unit 720, and the memory unit 720 comprises instructions 722. When executed by the computer processor 710, the instructions 722 may implement the method for operating the robot as described in the preceding paragraphs, and details will be omitted hereinafter.

In some embodiments of the present disclosure, a computer readable medium for simulating the at least one object in the manufacturing line is provided. The computer readable medium has instructions stored thereon, and the instructions, when executed on at least one processor, may cause at least one processor to perform the method for operating the robot as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous.

Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for operating a robot, comprising:
a processor; and
a non-transitory computer readable media having stored thereon instructions that are executable by the processor to perform operations comprising:
determine, by a first data collector coupled to the robot, a first position information of the robot based on feedback data received from a controller of the robot;
determine, by a second data collector coupled to a sensor, a second position information of an object to be operated by the robot based on sensing data received from the sensor, wherein the sensor and the robot are arranged in an operating environment;
generate, by a first estimator coupled to the first data collector and the second data collector based on the first position information and the second position information, a first prediction of a target position at which the object is operated by the robot, wherein the first estimator is further configured to:
record the sensing data including a time stamp representative of a receipt of each sensor data;
calibrate a first set of time stamps of the first position information and a second set of time stamps of the second position information based on a predetermined time delay between the time stamp each sensor data is received from the sensor and a sampled time point of each sensor data by the sensor; and
generate the first prediction of the target position by fusing a first set of sampled parameters from the first position information and a second set of sampled parameters from the second position information based on a fusion mode associated with an expected operation to be performed by the robot; and
generate, by a command generator coupled to the first estimator, a command for operating the robot at least partially based on the first prediction;
wherein the sensor is spaced apart from the robot in the operating environment.

2. The system of claim 1, wherein the first data collector is further configured to:
receive the feedback data of the robot in a first time period;
obtain, from the feedback data of the robot, a set of coordinate parameters of a joint end of the robot in a coordinate system of the robot; and
determine the first position information based on the set of coordinate parameters.

3. The system of claim 1, wherein the second data collector is further configured to:
receive the sensing data of the sensor in a second time period, the second time period overlapping with a first time period for receiving the feedback data of the robot;
obtain, from the sensing data of the sensor, a set of position relationships between the robot and the object in a further coordinate system of the sensor; and
determine the second position information based on the set of position relationships.

4. The system of claim 1, wherein the first estimator is further configured to:
obtain, from the first position information, a first set of sampled parameters characterizing a reference position of the robot at a predetermined time point; and
obtain, from the second position information, a second set of sampled parameters characterizing a reference position relationship between the robot and the object at the predetermined time point.

5. The system of claim 1, wherein the fusion mode comprises at least one of:
a predictor mode,
a filter mode,
a sum mode, or
a subtraction mode.

6. The system of claim 1, wherein the second data collector is further coupled to a further sensor and configured to determine third position information of the object based on further sensing data received from the further sensor; and
wherein the first estimator is further configured to generate a second prediction of the target position based on the first position information and the third position information.

7. The system of claim 6, the operations further comprising:
generate, by a second estimator coupled to the first estimator, a third prediction of the target position by fusing the first prediction of the target position and the second prediction of the target position.

8. The system of claim 7, wherein the command generator is further configured to generate the command for operating the robot based on the third prediction.

9. A method for operating a robot comprising:
determining a first position information of the robot based on a feedback data received from a robot controller;
determining a second position information of an object to be operated by the robot based on a sensing data received from a first sensor, the first sensor and the robot arranged in an operating environment;
recording the sensing data including a time stamp representative of a receipt of each sensor data;
calibrating a first set of time stamps of the first position information and a second set of time stamps of the second position information based on a predetermined time delay between the time stamp each sensor data is received from the first sensor and a sampled time point of each sensor data by the first sensor;
generating, based on fusing the first position information and the second position information using a predetermined fusion mode associated with an expected operation to be performed by the robot, a first prediction of a target position at which the object is operated by the robot; and
generating a command for operating the robot at least partially based on the first prediction;
wherein the sensor is spaced apart from the robot in the operating environment.

10. The method of claim 9, wherein determining the first position information comprises:
receiving the feedback data of the robot in a first time period;
obtaining, from the feedback data of the robot, a set of coordinate parameters of a joint end of the robot in a coordinate system of the robot; and
determining the first position information based on the set of coordinate parameters.

11. The method of claim 9, wherein determining the second position information comprises:
receiving the sensing data of the first sensor in a second time period, the second time period overlapping with a first time period for receiving the feedback data of the robot;
obtaining, from the sensing data of the first sensor, a set of position relationships between the robot and the object in a further coordinate system of the first sensor; and
determining the second position information based on the set of position relationships.

12. The method of claim 9, wherein generating the first prediction comprises:
obtaining, from the first position information, a first set of sampled parameters characterizing a reference position of the robot at a predetermined time point; and
obtaining, from the second position information, a second set of sampled parameters characterizing a reference position relationship between the robot and the object at the predetermined time point.

13. The method of claim 9, wherein the predetermined fusion mode comprises at least one of:
a predictor mode,
a filter mode,
a sum mode, or
a subtraction mode.

14. The method of claim 9, further comprising:
determining third position information of the object based on further sensing data received from a second sensor located further from the robot than the first sensor; and
generating a second prediction of the target position based on the first position information and the third position information.

15. The method of claim 14, further comprising:
generating a third prediction of the target position by fusing the first prediction of the target position and the second prediction of the target position.

16. The method of claim 15, further comprising:
generating the command for operating the robot based on the third prediction.

17. An electronic device comprising:
a processor; and
a memory coupled to the processor and storing instructions for execution, the instructions, when executed by the processor, causing the electronic device to perform the method of claim 9.

18. A non-transitory computer readable medium comprising program instructions for causing an electric device to perform at least the method of claim 9.

* * * * *